(12) United States Patent
Lee

(10) Patent No.: US 6,188,798 B1
(45) Date of Patent: Feb. 13, 2001

(54) APPARATUS AND METHOD FOR DETECTING MOTION VECTOR

(75) Inventor: Young Lee, Kyoungki-do (KR)

(73) Assignee: Hyundai Electronics Industries Co., Ltd., Kyoungki-do (KR)

( * ) Notice: Under 35 U.S.C. 154(b), the term of this patent shall be extended for 0 days.

(21) Appl. No.: 09/006,131

(22) Filed: Jan. 13, 1998

(30) Foreign Application Priority Data

Apr. 19, 1997 (KR) .................................... 97-14599

(51) Int. Cl.$^7$ .............................. G06K 9/36; H04N 7/12; H04N 11/02; H04N 5/14
(52) U.S. Cl. ...................... 382/251; 348/405; 348/421; 348/699
(58) Field of Search ................................ 382/107, 251, 382/253, 236, 221, 222; 348/154, 155, 352, 402, 413, 414, 416, 417, 418, 422, 699, 700, 405, 421

(56) References Cited

U.S. PATENT DOCUMENTS

| | | | |
|---|---|---|---|
| 4,903,124 | * | 2/1990 | Hoshi et al. .......................... 348/422 |
| 5,049,990 | * | 9/1991 | Kondo et al. ........................ 348/421 |
| 5,157,732 | | 10/1992 | Ishii et al. ............................ 382/107 |
| 5,612,751 | * | 3/1997 | Kondo ................................. 348/699 |
| 5,619,282 | * | 4/1997 | Song .................................... 348/716 |
| 5,726,712 | * | 3/1998 | Ogura .................................. 348/402 |

OTHER PUBLICATIONS

A Novel Vector Quantizer–Based Architecture for Block–Matching Motion Estimation, Bilgin et al; IEEE Paper in Signals, Systems and Computers; ISBN: 0–8186–7370–2, vol. 2. pp. 1403–1407, Nov. 1995.*

* cited by examiner

Primary Examiner—Amelia Au
Assistant Examiner—Mehrdad Dastouri
(74) Attorney, Agent, or Firm—Reed Smith Shaw & McClay LLP

(57) ABSTRACT

A motion vector detection apparatus is disclosed, including: a quantizer for receiving a value of reference pixel and value of pixel to be detected, detecting their maximum values and minimum values, and determining a quantization level using the detected maximum values and minimum values, to quantize the value of reference pixel and value of pixel to be detected; a plurality of processing units for receiving data outputted from the quantizer, and calculating a motion vector, the processing units being connected to the output terminal of the quantizer in parallel; and a minimum value detector for receiving data outputted from the processing units and detecting its minimum value, the minimum value detector being connected to the output terminal of the processing units. The present invention constructs the processing units simply according to the quantization of data using the quantizer, to increase the integration of the processing units in a single chip, improving the processing speed.

5 Claims, 5 Drawing Sheets

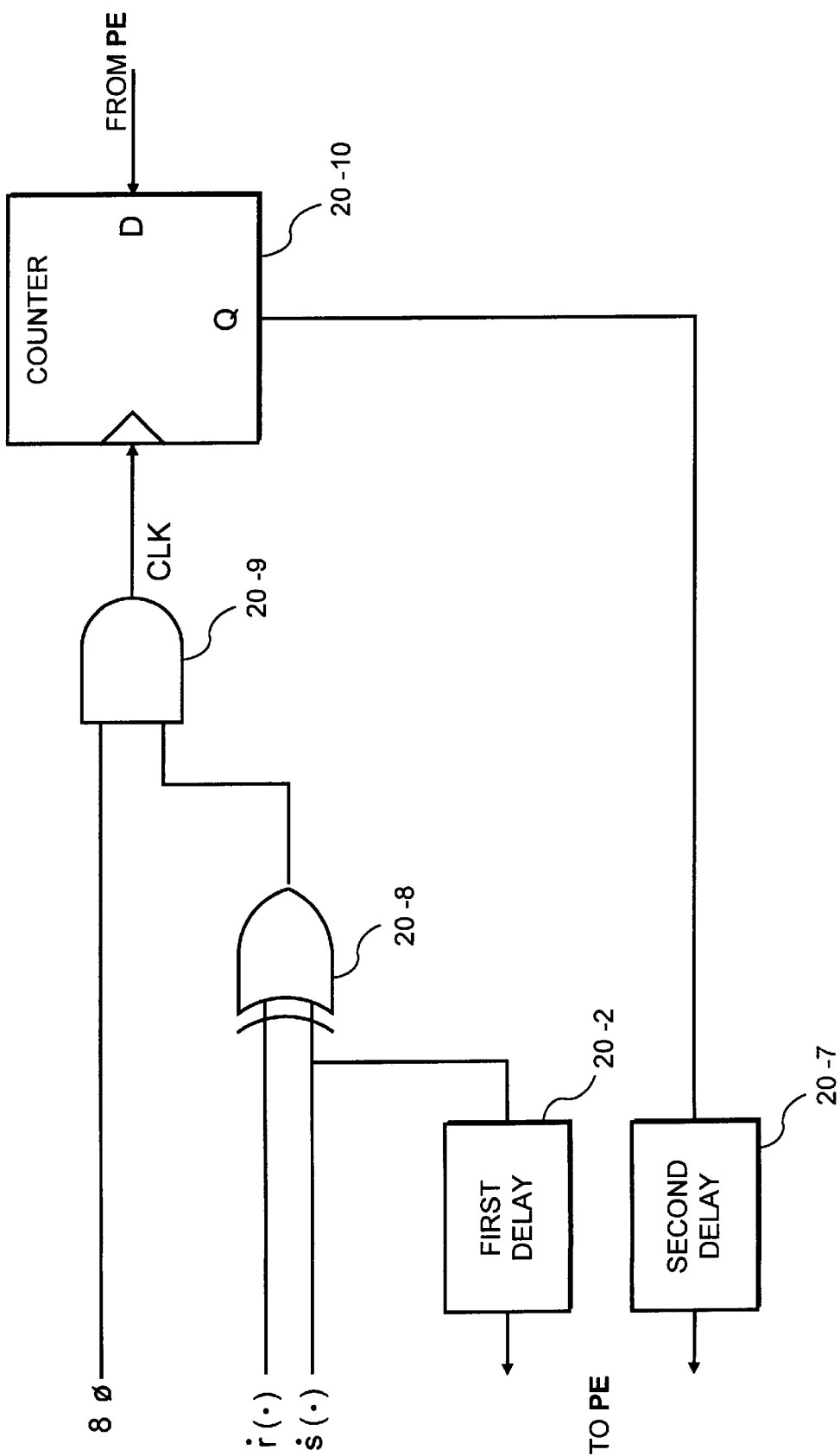
F I G. 5

APPARATUS AND METHOD FOR DETECTING MOTION VECTOR

BACKGROUND OF THE INVENTION

1. Field of the Invention

The present invention relates to a motion vector detection apparatus and, more particularly, to an apparatus for detecting motions between image frames continuously inputted, to calculate a motion vector in terms of pixel block.

2. Discussion of Related Art

In a computer vision field such as inspection and instrumentation, generally, motion vector calculation is required to detect where a reference model image is located in a frame to be detected. Security and supervision systems also need motion vector calculation to check if there is variation between image frames recorded at regular intervals. The computer vision field of inspection and instrumentation and security and supervision systems employ MPEG as a picture compression standard which uses a coding method according to motion correction between frames. This requires faster motion vector arithmetic.

The detection of the motion vector requires the existence of a reference picture frame and frame to be detected. The motion vector is a vector value representing that which picture data in the frame to be detected closely coincides with picture data in the reference picture frame. One motion vector is obtained for each pixel block in a specific size. The expression for calculating the motion vector is described below.

$$D(x, y) = \sum_{i=0}^{N} \sum_{J=0}^{N} |r(i, j) - s(I + x, j + y)| \quad (1)$$

In this expression, letting r(i,j) be pixel data in the reference picture frame, s(i,j) be pixel data in the frame to be detected, N×N be the size of pixel block whose motion vector is required, and (x,y) be the motion vector, when expression (1) is conducted for every location of (x,y) in a detection region, (x,y) which minimizes D(x,y) is determined as the motion vector. The calculation of the motion vector needs a large amount of operations. For this, a high-speed digital signal processor or exclusive hardware is used. With the high-speed digital processor, its algorithm is easy to change but its processing speed is limited, so that it cannot be used in real-time picture compression. The exclusive hardware employs a structure in which processing units are connected in parallel as shown in FIG. 1, to increase the processing speed. However, the configuration of each processing unit is so complicated, as shown in FIG. 2, that it is practically difficult to integrate a large number of processing units in a single chip.

Referring to FIG. 1, the conventional motion vector detection apparatus includes: a first frame memory 10 for receiving value R of reference pixel and value S of pixel to be detected, and temporarily storing them; a plurality of processing units 20, connected to the output terminal of first frame memory 10 in parallel, for receiving data outputted from first frame memory 10 and calculating motion vectors; and a minimum value detector 30, connected to the output terminal of processing units 20, for receiving data outputted from processing units 20 and detecting its minimum value.

Referring to FIG. 2, each processing unit 20 includes; a subtractor 20-1 for receiving value R of reference pixel and value S of pixel to be detected, and performing subtraction for them; a first delay 20-2 for delaying value S of pixel to be detected by a predetermined cycle; a second delay 20-3, connected to the output terminal of subtractor 20-1, for receiving data outputted from subtractor 20-1 and delaying it by a predetermined cycle; an absolute value evaluation section 20-4, connected to the output terminal of second delay 20-3, for receiving data outputted from second delay 20-3 and conducting absolute value evaluation; a third delay 20-5, connected to the output terminal of absolute value evaluation section 20-4, for receiving data outputted from absolute value evaluation section 20-4 and delaying it by a predetermined cycle; an adder 20-6, connected to the output terminal of third delay 20-5, for receiving data outputted therefrom and performing addition for it; and a fourth delay 20-7, connected to the output terminal of adder 20-6, for receiving data outputted therefrom and delaying it by a predetermined cycle.

In processing unit 20 of the aforementioned conventional motion vector detection apparatus, when value R of reference 8-bit pixel and value S of pixel to be detected enter to subtractor 20-1 at specific intervals, subtractor 20-1 performs subtraction for data received, and second delay 20-3 delays data outputted from subtractor 20-1. The delayed data is sent to absolute value evaluation section 20-4, and simultaneously, value R of new reference pixel and value S of new pixel to be detected are applied to subtractor 20-1. The delayed data passes through absolute value evaluation section 20-4, is delayed by third delay 20-5, is sent to adder 20-6, and simultaneously, the new value R of reference pixel and new value S of pixel to be detected, which are delayed by second delay 20-3, are applied to absolute value evaluation section 20-4. Through this process, calculations for three values R of reference pixel and values S of pixel to be detected are simultaneously carried out in one processing unit 20.

The addition result in one processing unit 20 is applied to neighboring processing unit 20 such that cumulative addition of the resultant values is carried out. The pixel value in the region to be detected is applied to subtractor 20-1, and at the same time, time-delayed through first delay 20-2, to be sent to neighboring processing unit 20. By doing so, it is possible to obtain an effect of moving the detection location. In the detection of motion vector using the above-described conventional motion vector detection apparatus, the processing units connected in parallel (shown in FIG. 1) are employed to increase the processing speed. However, the configuration of each processing unit (shown in FIG. 2) is so complicated that it is difficult for a large number of processing units to be integrated in a single chip.

Another apparatus for detecting a motion vector is disclosed in U.S. Pat. No. 5,157,732. This apparatus includes characteristic image memory means for storing an image signal for detecting a motion vector, image motion vector detection means for detecting an image motion vector from the image signal, reliability judgement means for judging the reliability of the detected motion vector, and signal processing means for processing the motion vector signal of the image signal according to the detected motion vector and reliability judgement result.

With this motion vector detection apparatus, the motion vector detected by the vector detection means is judged by the reliability judgement means if it is a correct motion vector, and then processed by the signal processing means, thereby detecting more accurate motion vector. That is, it is judged if the detected motion vector is for unnatural image, or time-delayed, and the motion vector is detected with regard to this judged result. However, this motion vector detection apparatus has also complicated configuration because of addition of processing unit such as the reliability judgement means, similar to the aforementioned conventional motion vector detection apparatus.

SUMMARY OF THE INVENTION

Accordingly, the present invention is directed to an apparatus and method for detecting a motion vector that substantially obviates one or more of the problems due to limitations and disadvantages of the related art.

An object of the present invention is to provide a motion vector detection apparatus, which is able to detect a motion vector with precision even if the motion vector is obtained after the number of bits of an image whose motion vector is to be calculated is reduced, and a quantizer and processing unit for the motion vector detection apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the motion vector detection apparatus, includes: a quantizer for receiving the value of a reference pixel and the value of pixel to be detected, detecting the maximum values and minimum values of each of the reference pixels and the pixels to be detected, and determining a quantization level using the detected maximum values and minimum values, to quantize the value of each reference pixel and value of each pixel to be detected; a plurality of processing units for receiving data outputted from the quantizer, and calculating a motion vector, the processing units being connected to the output terminal of the quantizer in parallel; and a minimum value detector for receiving data outputted from the processing units and detecting its minimum value, the minimum value detector being connected to the output terminal of the processing units.

The quantizer includes: a maximum/minimum value detection section for making pixel data inputted into a pixel block in a predetermined size, and detecting the maximum and minimum pixel values in the pixel block; a maximum/minimum value difference evaluation section for receiving the maximum and minimum pixel values from the maximum/minimum value detection section and calculating the difference between them, the maximum/minimum value difference evaluation section being connected to the output terminal of the maximum/minimum value detection section; a shifting section for receiving data outputted from the maximum/minimum value difference evaluation section, and shifting it, to calculate a quantization level; the shifting section being connected to the output terminal of the maximum/minimum value difference evaluation section; a frame memory for receiving and outputting the pixel data outputted from the maximum/minimum value detection section, the frame memory being connected to the output terminal of the maximum/minimum value detection section; an address generator for generating addresses where the value of reference pixel and value of pixel to be detected are located, the value of reference pixel and value of pixel to be detected being stored in the frame memory, the address generator being connected to the input terminal of the frame memory; a minimum value evaluation section for receiving data outputted from the maximum/minimum value detection section and frame memory, and calculating the minimum values of the value of reference pixel and value of pixel to be detected, the minimum value evaluation section being connected to the output terminals of the maximum/minimum value detection section and frame memory; and a comparator for receiving data outputted from the shifting section and data outputted from the minimum value evaluation section, and comparing them with each other, to quantize them, the comparator outputting the data as serial data, the comparator being connected to the output terminals of the shifting section and minimum value evaluation section.

The processing units includes: a first delay for receiving data outputted from the quantizer and delaying it by a predetermined cycle; an exclusive-OR gate for receiving data outputted from the quantizer and simultaneously performing subtraction and absolute value evaluation; an AND gate for receiving data outputted from the exclusive-OR gate and a bit clock signal, and synchronizing them with each other, the AND gate being connected to the output terminal of the exclusive-OR gate; a counter for receiving data outputted from the AND gate and counting it, to perform addition, the counter being connected to the output terminal of the AND gate; and a second delay for receiving data outputted from the counter and delaying it by a predetermined cycle, the second delay being connected to the output terminal of the counter.

The motion vector detecting process in the motion vector detection apparatus is constructed in such a manner that, when pixel data is inputted, a pixel block in a predetermined size is formed from the pixel data, the maximum and minimum values are detected in the pixel block, the difference value between them is calculated, a quantization level is determined according to the difference value, the pixel data is quantized according to the determined quantization level, and addition and subtraction are performed for the quantized data, to detect the motion vector.

The motion vector detection apparatus of the invention is constructed in such a manner that, when the quantizer receives pixel data, it quantizes the data using its maximum value and minimum value, and the processing unit receives the data outputted from the quantizer and calculates the motion vector with ease. The present invention constructs the processing unit simply according to the quantizing process using the quantizer, and increases the integration of the processing unit in one chip, to improve the calculation speed.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 5 is a block diagram illustrating a configuration of the processing unit of the motion vector detection apparatus according to the present invention.

DETAILED DESCRIPTION OF PREFERRED EMBODIMENT

Figure 1:
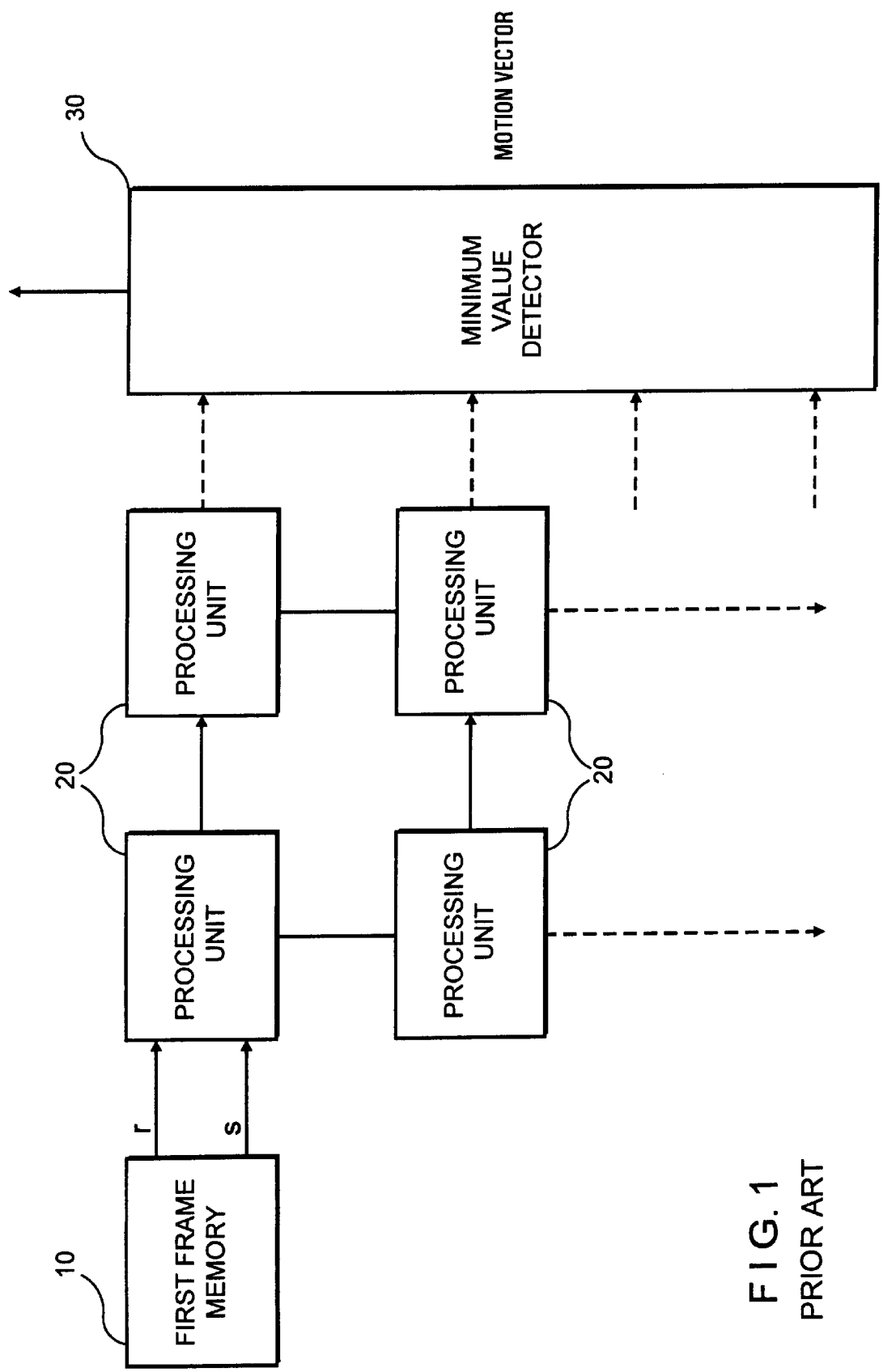
FIG. 1 is a block diagram illustrating a configuration of a conventional motion vector detection apparatus.
Figure 2:
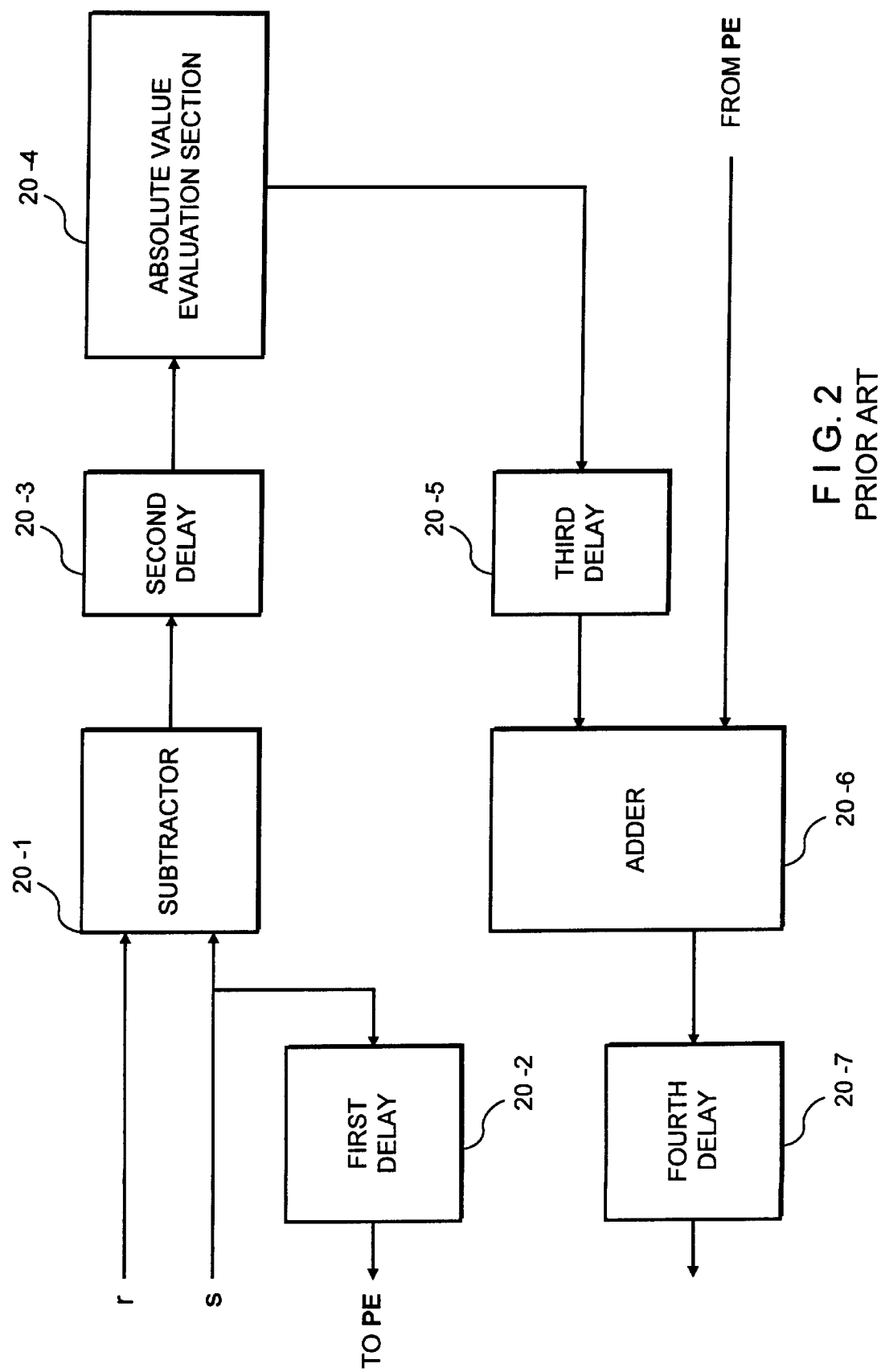
FIG. 2 is a block diagram illustrating a configuration of the processing unit of the conventional motion vector detection apparatus.

Reference will now be made in detail to the preferred embodiments of the present invention, examples of which are illustrated in the accompanying drawings. It should be noted in the drawings that like components are indicated by like reference numerals.

Figure 3:
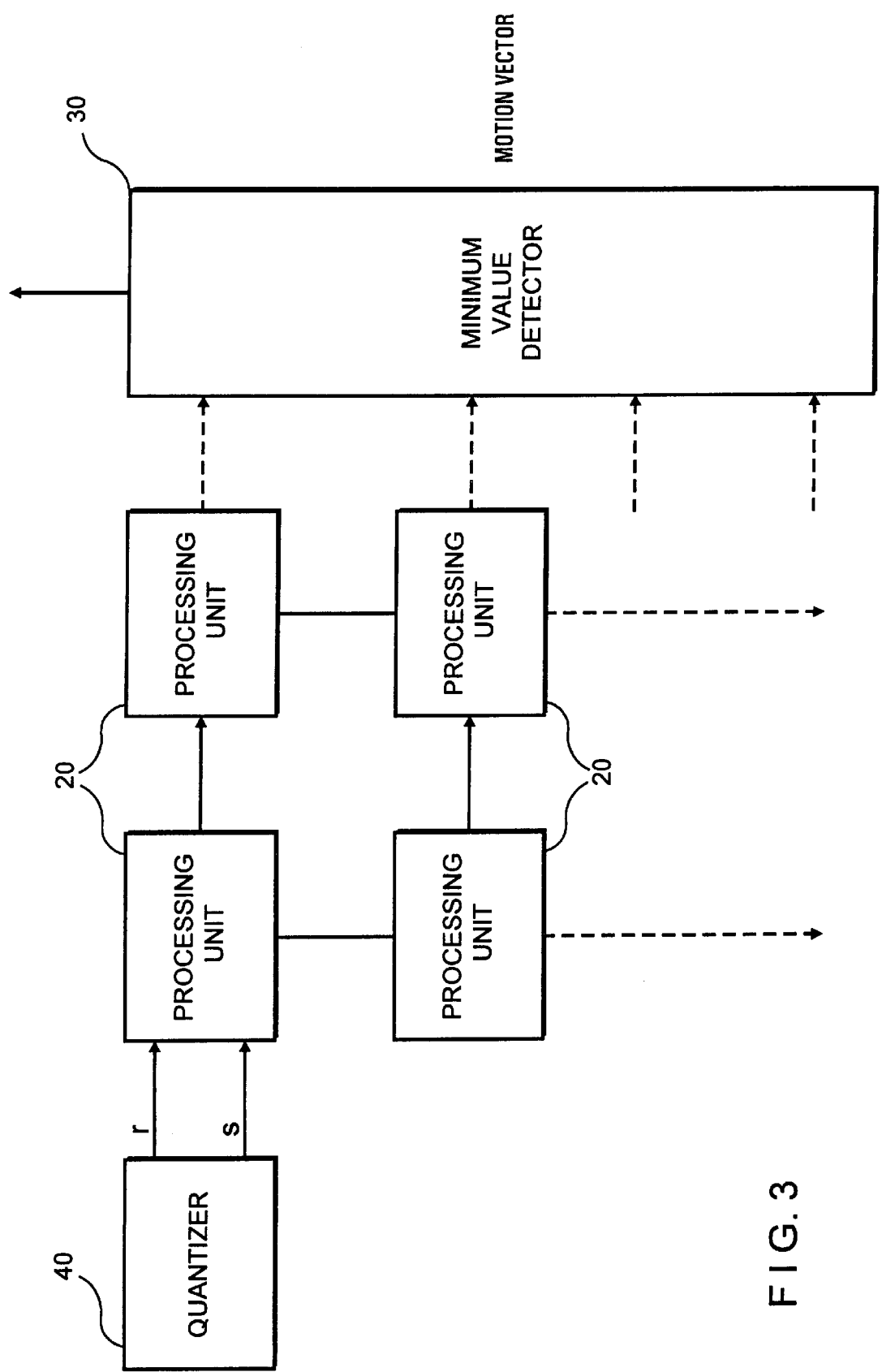
FIG. 3 is a block diagram illustrating a configuration of a motion vector detection apparatus according to the present invention.

Referring to FIG. 3, the motion vector detection apparatus according to an embodiment of the invention includes: a quantizer 40 for inputting pixel data to receive value R of reference pixel and value S of pixel to be detected, and quantizing them; a plurality of processing units 20 connected to the output terminal of quantizer 40 in parallel, for receiving data outputted therefrom and calculating a motion vector; and a minimum value detector 30, connected to the output terminal of processing units 20, for receiving data outputted therefrom, and detecting its minimum value.

Figure 4:
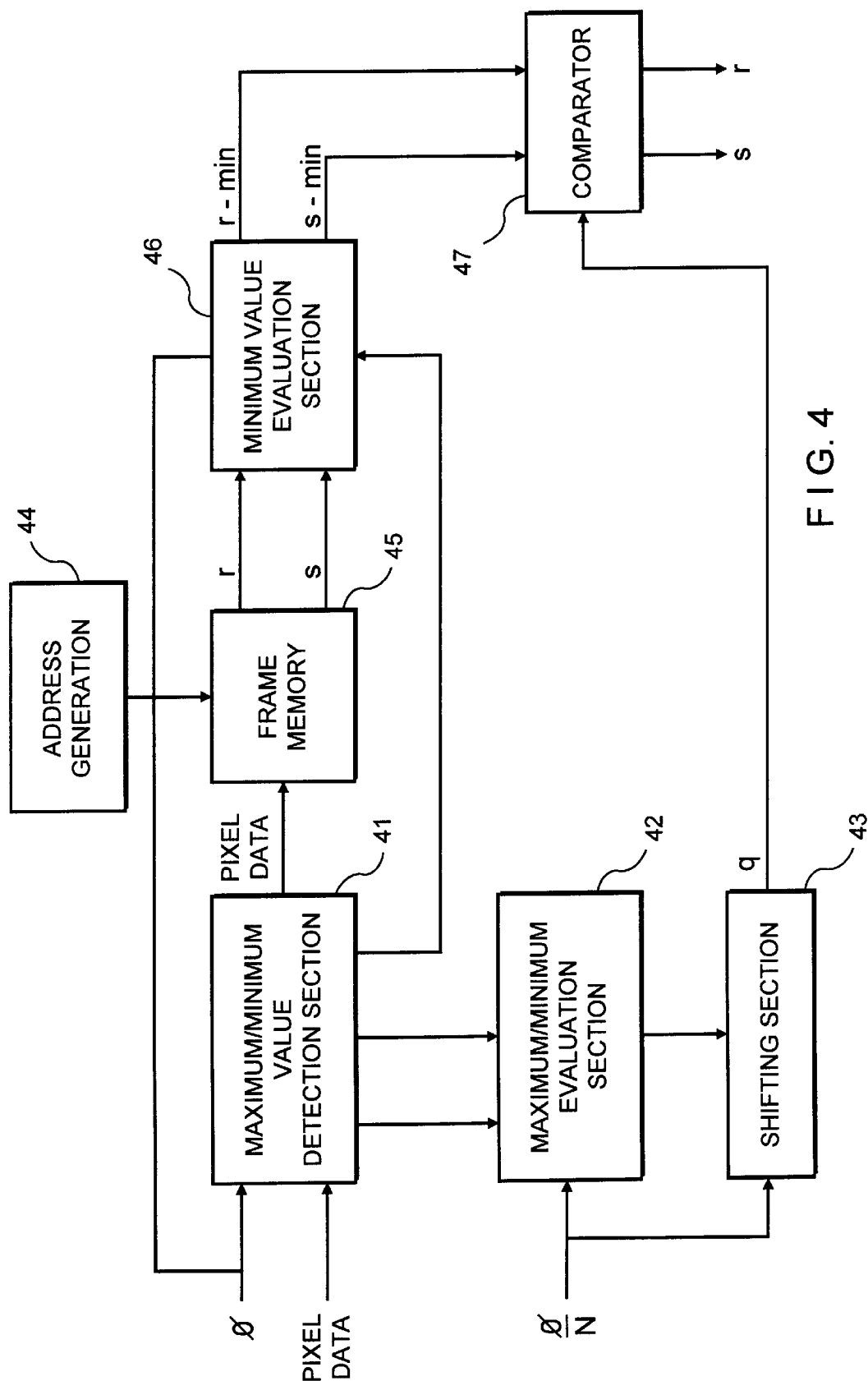
FIG. 4 is a block diagram illustrating a configuration of the quantizer of the motion vector detection apparatus according to the present invention.

Referring to FIG. 4, quantizer 40 according to an embodiment of the invention includes: a maximum/minimum value detection section 41 for making the pixel data inputted into a pixel block in a predetermined size, and detecting its maximum pixel value and minimum pixel value in the pixel block; a maximum/minimum value difference evaluation section 42, connected to the output terminal of maximum/minimum value detection section 41, for receiving the maximum pixel value and minimum pixel value outputted therefrom and calculating the difference between them; a shifting section 43, connected to the output terminal of maximum/minimum value difference evaluation section 42, for receiving data outputted therefrom and shifting it, to calculate a quantization level; a frame memory 45, connected to the output terminal of maximum/minimum value detection section 41, for receiving and outputting the pixel data outputted therefrom; an address generator 44, connected to the input terminal of frame memory 45, for generating addresses where value R of reference pixel and value S of pixel to be detected, stored in frame memory 45, are located; a minimum value evaluation section 46, connected to the output terminals of maximum/minimum value detection section 41 and frame memory 45, for receiving data outputted therefrom, and calculating the minimum values of value R of reference pixel and value S of pixel to be detected; and a comparator 47, connected to the output terminals of shifting section 43 and minimum value evaluation section 46, for receiving each data outputted from each of them, comparing them to quantize output data, and outputting it as serial data.

Referring to FIG. 5, each processing unit 20 according to an embodiment of the invention includes: a first delay 20-2 for receiving data outputted from quantizer 40 and delaying it by a predetermined cycle; an exclusive-OR gate 20-8 for receiving data outputted from quantizer 40 and performing subtraction and absolute evaluation; an AND gate 20-9, connected to the output terminal of exclusive-OR gate 20-8, for receiving data outputted from exclusive-OR gate 20-8 and a bit clock signal, and synchronizing them with each other; a counter 20-10, connected to the output terminal of AND gate 20-9, for receiving data outputted therefrom, and counting it to perform addition operation; and a second delay 20-7, connected to the output terminal of counter 20-10, for receiving data outputted therefrom, and delaying it by a predetermined cycle.

A method of detecting a motion vector in the motion vector detection apparatus of the invention is executed in a manner that the input pixel data is quantized, and then the operation of data for the motion vector detection is carried out. First of all, when pixel data is inputted, a pixel block in a predetermined size is formed from the pixel data, and its maximum and minimum values in the pixel block are detected. Then, the difference value between the maximum and minimum values is calculated, and a quantization level is determined according to the calculated difference value. Value R of Reference pixel and value S of pixel to be detected are extracted from the pixel data, and made into values having a magnitude adjusted based on the minimum value. Value R of reference pixel and value S of pixel to be detected which have the magnitude adjusted based on the minimum value are quantized according to the determined quantization level. The data operation method for detecting the motion vector is performed in a manner that value R of reference pixel and value S of pixel to be detected are subtracted, added, counted, and delayed.

With the motion vector detection apparatus of the invention, when pixel data is inputted to quantizer 40, quantizer 40 quantizes it using its maximum and minimum values, and processing units 20 receive data outputted from quantizer 40 and calculate the motion vector with ease. The quantization process of the pixel data applied to quantizer 40 is explained below. When pixel data is inputted to maximum/minimum value detection section 41 in byte units, and '0' representing a byte clock signal is also inputted thereto, maximum/minimum value detection section 41 forms a pixel block in the size of N×N (usually 16×16) from the pixel data inputted, detects the maximum and minimum pixel values in the pixel block and sends them to maximum/minimum value difference evaluation section 42. Maximum/minimum value detection section 41 sends the pixel value from which the maximum and minimum values are detected to frame memory 45.

Maximum/minimum value difference evaluation section 42 obtains the difference between the maximum and minimum values and sends it to shifting section 43 which conducts the operation of (maximum value−minimum value)/L using the difference value between the maximum and minimum values, to output a value representing a quantization level. Address generator 44 generates addresses where value R of reference pixel and value S of pixel to be detected are located, which are stored in frame memory 45, and sends them to frame memory 45. Frame memory 45 outputs value R of reference pixel and value S of pixel to be detected to minimum value evaluation section 46 which makes the magnitudes of pixel values inputted from frame memory 45 to be adjusted based on the minimum value, and sends them to comparator 47.

Comparator 47 compares 8-bit data received from minimum value evaluation section 46 with the quantization level inputted from shifting section 43, to quantize the 8-bit data into 3-bit data of 0 to 7. Then, comparator 47 converts the quantized data into 8-bit serial data and outputs it as value R of reference pixel and value S of pixel to be detected. In the above-described expression (maximum value−minimum value)/L, $L=2^M$, where M is the number of output bits of quantizer 40. In the present invention, L becomes 8 since M=3.

Quantizer 40 performs right shift five times to quantize the data in order to reduce the 8-bit pixel data into 3-bit data. Here, neighboring pixels likely have similar values in a specific pixel block, and it is almost impossible for the pixel values to be dispersed over the entire eight bit region of 0 to 255. Accordingly, to reduce the error due to the quantization, the maximum and minimum values are detected from the whole pixel data in the pixel block, and quantization is carried out in the range of the maximum and minimum values, to assign a 3-bit value, that is, a value of 0 to 7. The 3-bit data of 0 to 7, for which the quantization is conducted, is converted into 8-bit data having '1's corresponding to the magnitude of the data, in order to simplify the calculation in processing units 20, to be outputted as value R of reference pixel and value S of pixel to be detected. For example, when the original data is '011', the converted data becomes '00000111'.

When value R of reference pixel and value S of pixel to be detected are sent from quantizer 40 to processing units 20, since they are 8-bit serial data having '1's corresponding to the magnitude of the data, subtraction and addition operations are simultaneously performed while they pass through exclusive-OR gate 20-8. This result is synchronized with the bit clock in AND gate 20-9, to be inputted to counter 20-10 which counts it to execute addition operation for it. According to the embodiment of present invention, the integration of the processing units in one chip is increased, improving the processing speed.

As described above, the present invention simplifies the configuration of processing units, compared with the conventional one, instead of employing one quantizer at the input port of the motion vector detector, resulting in simplification of the hardware structure of motion vector detection apparatus. Accordingly, a large number of processing units can be integrated in one chip, improving the processing speed which affects the product quality.

It will be apparent to those skilled in the art that various modifications and variations can be made in the apparatus and method for detecting a motion vector of the present invention without departing from the spirit or scope of the invention. Thus, it is intended that the present invention cover the modifications and variations of this invention provided they come within the scope of the appended claims and their equivalents.

What is claimed is:

1. A motion vector detection apparatus, comprising:
    a quantizer for receiving a value of each reference pixel and value of each pixel to be detected, detecting the minimum values and minimum values of each reference pixel and of each pixel to be detected, and determining a quantization level using the detected maximum values and minimum values, to quantize the value of each reference pixel and value of each pixel to be detected;
    a plurality of parallel processing units for receiving data outputted from the quantizer, and calculating a motion vector, the processing units being connected to the output terminal of the quantizer in parallel;
    a minimum value detector for receiving data outputted from the quantizer as serial data to the processing units and detecting its minimum value, the minimum value detector being connected to the output terminal of the processing units; and
    a single frame memory for receiving and outputting pixel data outputted from a maximum/minimum value detection section.

2. The motion vector detection apparatus as claimed in claim 1, wherein the quantizer comprises:
    a maximum/minimum value detection section for making pixel data inputted into a pixel block in a predetermined size, and detecting the maximum and minimum pixel values in the pixel block and outputting pixel data;
    a maximum/minimum value difference evaluation section for receiving the maximum and minimum pixel values from the maximum/minimum value detection section and calculating the difference between them, the maximum/minimum value difference evaluation section being connected to the output terminal of the maximum/minimum value detection section;
    a shifting section for receiving data outputted from the maximum/minimum value difference evaluation section, and shifting it, to calculate a quantization level; the shifting section being connected to the output terminal of the maximum/minimum value difference evaluation section.
    the single frame memory being connected to the output terminal of the maximum/minimum value detection section;
    an address generator for generating addresses where the value of reference pixel and value of pixel to be detected are located, the value of reference pixel and value of pixel to be detected being stored in the frame memory, the address generator being connected to the input terminal of the frame memory;
    a minimum value evaluation section for receiving data outputted from the maximum/minimum value detection section and frame memory, and calculating minimum values of the value of reference pixel and value of pixel to be detected, the minimum value evaluation section being connected to the output terminals of the maximum/minimum value detection section and frame memory; and
    a comparator for receiving data outputted from the shifting section and data outputted from the minimum value evaluation section, and comparing them with each other, to quantize them, the comparator outputting the data as serial data, the comparator being connected to the output terminals of the shifting section and minimum value evaluation section.

3. The motion vector detection apparatus as claimed in claim 1, wherein the processing units comprises:
    a first delay for receiving data outputted from the quantizer and delaying it by a predetermined cycle;
    an exclusive-OR gate for receiving data outputted from the quantizer and simultaneously performing subtraction and absolute value evaluation;
    an AND gate for receiving data outputted from the exclusive-OR gate and a bit clock signal, and synchronizing them with each other, the AND gate being connected to the output terminal of the exclusive-OR gate;
    a counter for receiving data outputted from the AND gate and counting it, to perform addition, the counter being connected to the output terminal of the AND gate; and
    a second delay for receiving data outputted from the counter and delaying it by a predetermined cycle, the fourth delay being connected to the output terminal of the counter.

4. A motion vector detecting method for motion correction of a moving picture signal, the method comprising:

a pixel block formation step of forming a pixel block in a predetermined size when pixel data inputted, a maximum/minimum value difference evaluation step of detecting the maximum and minimum values in the pixel block formed at the pixel block formation step, and calculating the difference between them;

a quantization level determination step of dividing the difference in value between the maximum and minimum values by $2^M$, where M is the number of bits, corresponding to the number of bits outputted as serial data during quantization, thereby determining a quantization level;

a step of extracting a value of reference pixel and value of pixel to be detected from the pixel data, and make them into data having a magnitude adjusted based on the minimum value; and a quantization step of quantizing the value of reference pixel and value of pixel to be detected, which are made into the data having the magnitude identical to the minimum value, according to the quantization level determined at the quantization level determination step, the above-described steps being processing steps performed before operation processes for detecting motion vectors according to pixel data in a predetermined block unit.

5. The motion vector detecting method as claimed in claim 4, further comprising a data conversion step of converting the data quantized through the quantization step into serial data of a predetermined bit, by making the quantized data have '1's corresponding to its magnitude.

* * * * *